US012586541B2

(12) United States Patent
Kim et al.

(10) Patent No.: US 12,586,541 B2
(45) Date of Patent: Mar. 24, 2026

(54) DISPLAY DEVICE HAVING A DRIVING CONTROLLER FOR OUTPUTTING FRAME PROTOCOL DATA AND OPERATING METHOD OF THE DISPLAY DEVICE

(71) Applicant: Samsung Display Co., LTD., Yongin-si (KR)

(72) Inventors: Sooyeon Kim, Yongin-si (KR); Chongguk Lee, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/907,789

(22) Filed: Oct. 7, 2024

(65) Prior Publication Data

US 2025/0201200 A1 Jun. 19, 2025

(30) Foreign Application Priority Data

Dec. 15, 2023 (KR) ........................ 10-2023-0183202

(51) Int. Cl.
*G09G 3/3275* (2016.01)
*G09G 3/32* (2016.01)

(52) U.S. Cl.
CPC ............. *G09G 3/3275* (2013.01); *G09G 3/32* (2013.01); *G09G 2310/0275* (2013.01)

(58) Field of Classification Search
CPC .................................................... G09G 3/3275
USPC .......................................................... 345/204
See application file for complete search history.

(56) References Cited

U.S. PATENT DOCUMENTS

| | | | | |
|---|---|---|---|---|
| 11,107,385 | B2 | 8/2021 | Kim et al. | |
| 11,283,449 | B2 | 3/2022 | Pyun et al. | |
| 2021/0201734 | A1* | 7/2021 | Kim | G09G 3/20 |
| 2021/0281263 | A1* | 9/2021 | Pyun | G09G 3/2096 |
| 2023/0154378 | A1* | 5/2023 | Kwon | G09G 3/2092 |
| 2023/0206885 | A1 | 6/2023 | Kwon et al. | |

FOREIGN PATENT DOCUMENTS

| | | | |
|---|---|---|---|
| CN | 113570997 | A | 10/2021 |
| KR | 1020210111937 | A | 9/2021 |
| KR | 1020230096524 | A | 6/2023 |

* cited by examiner

*Primary Examiner* — Long D Pham
(74) *Attorney, Agent, or Firm* — CANTOR COLBURN LLP

(57) ABSTRACT

Disclosed is a display device including a display panel, a driving controller that transmits a data control signal, and a data driving circuit. The data driving circuit receives the data control signal and provides a data signal to the display panel based on the data control signal. The data control signal includes frame protocol data for setting an operation of the data driving circuit. The frame protocol data includes a protocol data number signal, frame configuration data, and scrambled dummy data.

18 Claims, 12 Drawing Sheets

FIG. 7

| | P5 | P4 | P3 | P2 | P1 | P0 |
|---|---|---|---|---|---|---|
| T1 | TCD(100000) | | | | | |
| T2 | P4 bar | OCHOP[1] | | | | |
| T3 | P4 bar | OCHOP[0] | | | | |
| T4 | P4 bar | GCHOP[1] | | | | |
| T5 | P4 bar | GCHOP[0] | | | | |
| T6 | P4 bar | PPT | | | | |
| T7 | P4 bar | SB_F[2] | | | | |
| T8 | P4 bar | SB_F[1] | | | | |
| ⋮ | ⋮ | ⋮ | | | | |
| T93 | | | | | | |
| T94 | TCD(100000) | | | | | |
| T95 | P4 bar | Reserved | | | | |
| T96 | P4 bar | Reserved | | | | |
| T97 | P4 bar | Reserved | | | | |
| T98 | P4 bar | Reserved | | | | |
| T99 | P4 bar | Reserved | | | | |
| T100 | P4 bar | Reserved | | | | |

FIG. 8

| | P5 | P4 | P3 | P2 | P1 | P0 |
|---|---|---|---|---|---|---|
| T1 | TCD(100000) | | | | | |
| T2 | P4 bar | P_NUM[2] | | | | |
| T3 | P4 bar | P_NUM[1] | | | | |
| T4 | P4 bar | P_NUM[0] | | | | |
| T5 | P4 bar | OCHOP[1] | | | | |
| T6 | P4 bar | OCHOP[0] | | | | |
| T7 | P4 bar | GCHOP[1] | | | | |
| T8 | P4 bar | GCHOP[0] | | | | |
| ⋮ | ⋮ | ⋮ | | | | |
| T96 | | | | | | |
| T97 | TCD(011111) | | | | | |
| T98 | P4 bar | XP_NUM[2] | | | | |
| T99 | P4 bar | XP_NUM[1] | | | | |
| T100 | P4 bar | XP_NUM[0] | | | | |
| T101 | P4 bar | XOCHOP[1] | | | | |
| T102 | P4 bar | XOCHOP[0] | | | | |
| T103 | P4 bar | XGCHOP[1] | | | | |

DISPLAY DEVICE HAVING A DRIVING CONTROLLER FOR OUTPUTTING FRAME PROTOCOL DATA AND OPERATING METHOD OF THE DISPLAY DEVICE

This application claims priority to Korean Patent Application No. 10-2023-0183202, filed on Dec. 15, 2023, and all the benefits accruing therefrom under 35 U.S.C. § 119, the content of which in its entirety is herein incorporated by reference.

BACKGROUND

Field

Embodiments of the present disclosure described herein relate to a display device.

Description of the Related Art

A display device may include a driving controller, a data driving circuit, a scan driving circuit, and a display panel. The driving controller and the data driving circuit may be connected to each other through a predetermined interface. The driving controller may provide a data signal and a control signal to the data driving circuit.

SUMMARY

Embodiments of the present disclosure provide a display device with improved reliability and an operating method of the display device.

According to an embodiment, a display device includes a display panel, a driving controller that transmits a data control signal, and a data driving circuit. The data driving circuit is configured to receive the data control signal and provide a data signal to the display panel based on the data control signal. The data control signal includes frame protocol data for setting an operation of the data driving circuit. The frame protocol data includes a protocol data number signal, frame configuration data, and scrambled dummy data.

In an embodiment, the data driving circuit may further be configured to determine a length of the frame configuration data based on the protocol data number signal included in the frame protocol data and ignore the scrambled dummy data received after the frame configuration data.

In an embodiment, the protocol data number signal and the frame configuration data may not be scrambled.

In an embodiment, the protocol data number signal may be included at a start location of the frame protocol data.

In an embodiment, the driving controller may be configured to generate the scrambled dummy data by scrambling the protocol data number signal and the frame configuration data.

In an embodiment, the data control signal includes display data during an active period and the frame protocol data during a blank period.

In an embodiment, a length of the display data may be equal to a length of the frame protocol data.

In an embodiment, the data driving circuit may be configured to restore the display data as the data signal.

In an embodiment, the data driving circuit may be configured to increase a count value associated with the frame configuration data when the frame configuration data is received, and ignore the scrambled dummy data received after the frame configuration data when the count value is greater than or equal to the protocol data number signal.

In an embodiment, the data control signal may be a signal which swings between a first driving voltage and a second driving voltage.

According to an embodiment, an operating method of a display device includes transmitting display data to a data driving circuit, transmitting a protocol data number signal to the data driving circuit, transmitting frame configuration data to the data driving circuit, and transmitting scrambled dummy data to the data driving circuit.

In an embodiment, the operating method may further include determining, by the data driving circuit, a length of the frame configuration data based on the protocol data number signal, and ignoring, by the data driving circuit, the scrambled dummy data.

In an embodiment, the protocol data number signal and the frame configuration data may not be scrambled.

In an embodiment, the transmitting of the scrambled dummy data to the data driving circuit may include generating the scrambled dummy data by scrambling the protocol data number signal and the frame configuration data.

In an embodiment, the protocol data number signal, the frame configuration data and the scrambled dummy data are included in frame protocol data.

In an embodiment, a length of the display data may be the same as a length of the frame protocol data.

In an embodiment, the method may further include restoring, by the data driving circuit, the display data as a data signal and providing, by the data driving circuit, the data signal to a display panel.

In an embodiment, the method may further include increasing, by the data driving circuit, a count value associated with the frame configuration data when the frame configuration data is received.

In an embodiment, the method may further include ignoring, by the data driving circuit, the scrambled dummy data received after the frame configuration data, when the count value is greater than or equal to the protocol data number signal.

In an embodiment, the method may further include receiving the frame configuration data at the data driving circuit when the count value is smaller than the protocol data number signal.

BRIEF DESCRIPTION OF THE DRAWINGS

The above and other objects and features of the present disclosure will become apparent by describing in detail embodiments thereof with reference to the accompanying drawings.

FIGS. 7 and 8 illustrate frame protocol data according to an embodiment of the present disclosure.

DETAILED DESCRIPTION

Figure 1:
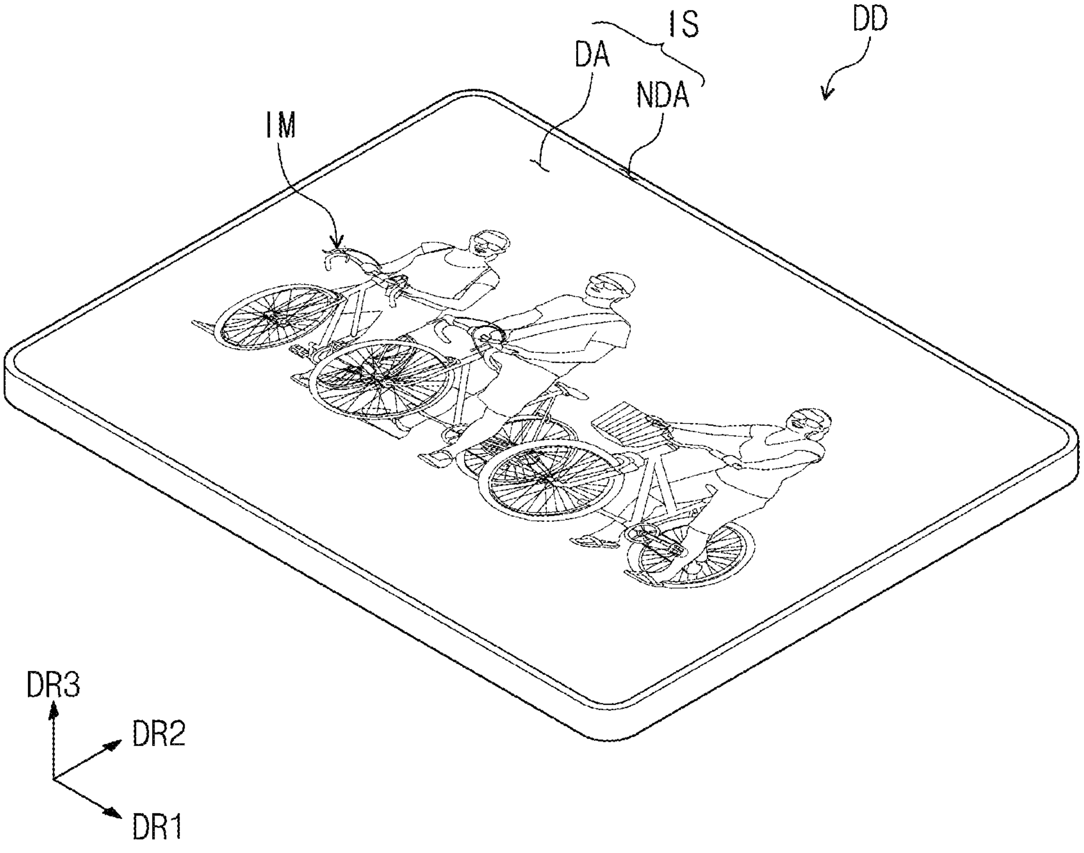
FIG. 1 is a perspective view of a display device, according to an embodiment of the present disclosure.

In the specification, the expression that a first component (or region, layer, part, or the like) is "on", "connected with", or "coupled with" a second component means that the first component is directly on, connected with, or coupled with the second component or means that a third component is interposed between the first component and the second component.

The same sign refers to the same element. In some aspects, in drawings, the thickness, ratio, and dimension of components are exaggerated for effectiveness of description of technical contents. The term "and/or" includes one or more combinations of the associated listed items.

Although the terms "first", "second", or the like may be used to describe various components, the components should not be construed as being limited by the terms. The terms are used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

In some aspects, the terms "under", "beneath", "on", "above", or the like are used to describe a relationship between components illustrated in a drawing. The terms are relative and are described with reference to a direction indicated in the drawing.

It will be understood that the terms "include", "comprise", "have", or the like specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of a display device DD, according to an embodiment of the present disclosure.

Referring to FIG. 1, the display device DD may be a device activated based on an electrical signal. The display device DD according to the present disclosure may be a small and medium-sized electronic device such as, for example, a mobile phone, a tablet PC, a notebook computer, a vehicle navigation system, or a game console, as well as a large-sized electronic device such as, for example, a television or a monitor. The above are provided as examples, and embodiments described herein support applying the display device DD to any other display device(s) without departing from the concept of the present disclosure.

The display device DD may be rectangular shaped, having a long side in the first direction DR1 and a short side in the second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member of the display device DD are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. In some embodiments, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs such as, for example, a part of his/her body, light, heat, his/her gaze, and pressure, or a combination thereof. In some aspects, the display device DD may sense the external input of the user applied to a side surface or a rear surface of the display device DD depending on a structure of the display device DD and is not limited to an embodiment. As an example of the present disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may be an area in which the image IM is displayed. A user perceives (or views) the image IM through the display area DA. In an embodiment, the display area DA is illustrated in the shape of a quadrangle of which the vertexes are rounded. However, this is illustrated as an example. The display area DA may have various shapes and is not limited to any one embodiment.

The non-display area NDA is adjacent to the display area DA. The non-display area NDA may have a given color. The non-display area NDA may surround the display area DA. Accordingly, a shape of the display area DA may be defined substantially by the non-display area NDA. However, this is illustrated as an example. The non-display area NDA may be positioned to be adjacent to a single side of the display area DA or may be omitted. The display device DD according to an embodiment of the present disclosure may include various embodiments and is not limited to an embodiment. The term "substantially," as used herein, means approximately or actually.

Figure 2:
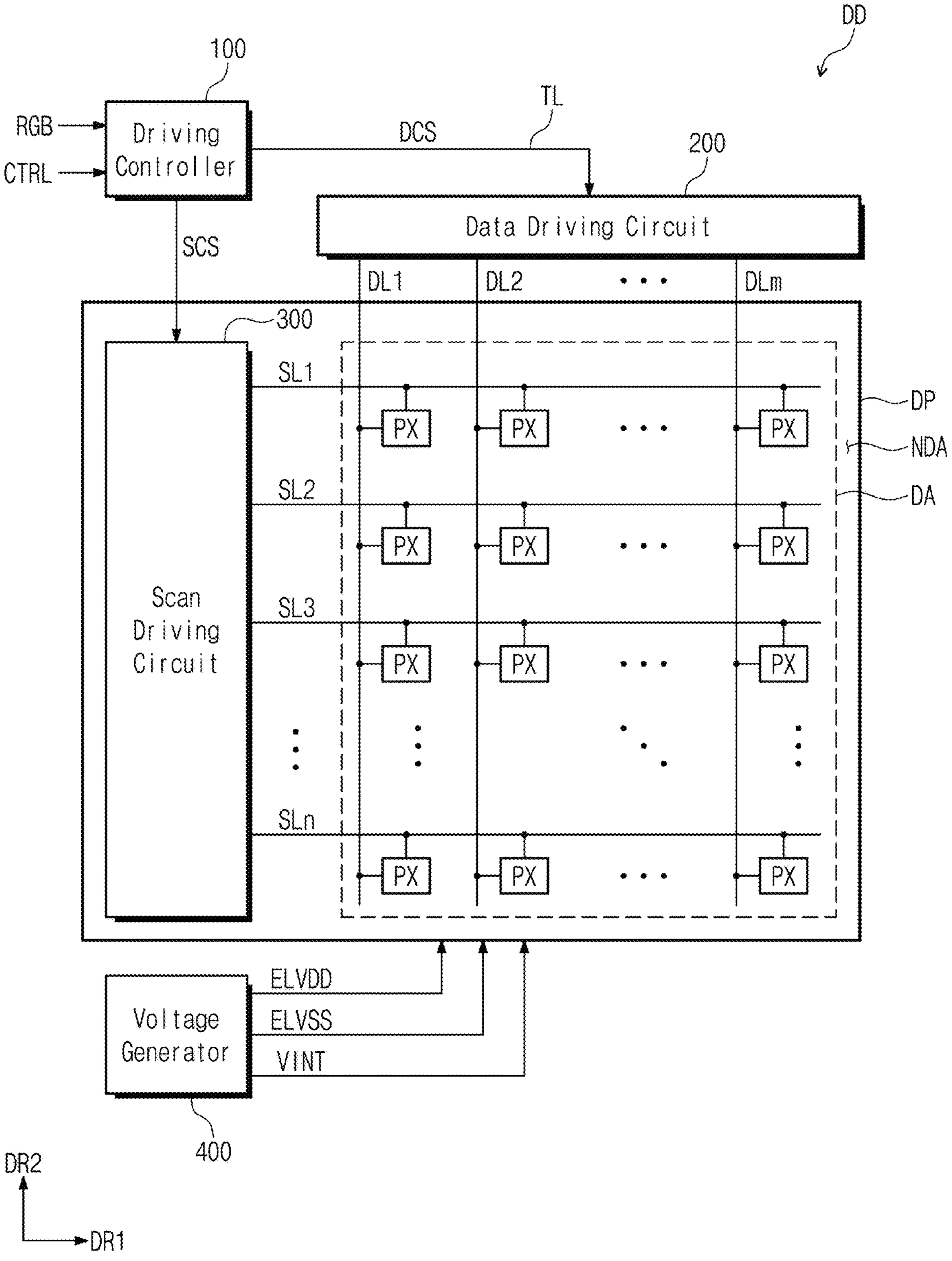
FIG. 2 is a block diagram of a display device, according to an embodiment of the present disclosure.

FIG. 2 is a block diagram of the display device DD, according to an embodiment of the present disclosure.

Referring to FIG. 2, the display device DD includes a driving controller 100, a data driving circuit 200, a scan driving circuit 300, a voltage generator 400, and a display panel DP.

The driving controller 100 receives an input image signal RGB and a control signal CTRL. The driving controller 100 provides a data control signal DCS to the data driving circuit 200 through a transmission line TL. The driving controller 100 provides a scan control signal SCS to the scan driving circuit 300.

The data driving circuit 200 receives the data control signal DCS from the driving controller 100. The data driving circuit 200 restores data signals based on the data control signal DCS and outputs the data signals to the display panel DP. The data signals may be provided to a plurality of data lines DL1 to DLm of the display panel DP, which will be described later.

The scan driving circuit 300 receives the scan control signal SCS from the driving controller 100. The scan driving circuit 300 outputs scan signals to a plurality of scan lines SL1 to SLn, which will be described later. In an embodiment, the scan signals provided to the plurality of scan lines SL1 to SLn may sequentially transition to an active level.

According to an embodiment of the present disclosure, the display panel DP may include a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, or the like. Hereinafter, in an embodiment, the description will be given under the condition that the display panel DP is an organic light emitting display panel.

The display panel DP includes the scan lines SL1 to SLn, the data lines DL1 to DLm, and pixels PX.

Each of the pixels PX may be placed in an area where 'n' rows intersect 'm' columns. Each of the pixels PX may be connected to a corresponding scan line among the scan lines SL1 to SLn, and each of the pixels PX may be connected to a corresponding data line among the data lines DL1 to DLm. FIG. 1 illustrates that each pixel PX is connected to one scan line, but embodiments of the present disclosure are not limited thereto. For example, a pixel PX may be electrically connected to two or more scan lines.

Each of the pixels PX may include a light emitting element (not illustrated) and a pixel circuit (not illustrated) that controls the emission of the light emitting element. In an embodiment, the light emitting element may be an organic light emitting diode. However, embodiments of the present disclosure are not limited thereto.

The scan lines SL1 to SLn extend from the scan driving circuit 300 in the first direction DR1 and are arranged spaced apart from one another in the second direction DR2. The data lines DL1 to DLm extend from the data driving circuit 200 in a direction opposite to the second direction DR2 and are arranged spaced apart from one another in the first direction DR1.

The scan driving circuit 300 may be placed on the display panel DP. In an embodiment, the pixels PX may be placed in the display area DA of the display panel DP, and the scan driving circuit 300 may be placed in the non-display area NDA of the display panel DP. In an embodiment, the scan driving circuit 300 may be formed in the same process as a pixel circuit of each of the pixels PX, but embodiments of the present disclosure are not limited thereto.

In an embodiment, the data driving circuit 200 may be implemented with an integrated circuit to be mounted on the display panel DP. In an embodiment, the data driving circuit 200 may be placed on a printed circuit board and may be electrically connected to the display panel DP through the printed circuit board.

The voltage generator 400 provides voltages (e.g., a first voltage ELVDD, a second voltage ELVSS, and a third voltage VINT) necessary for the operation of the display panel DP. The number of voltages generated by the voltage generator 400 may be changed in various ways.

Figure 3:
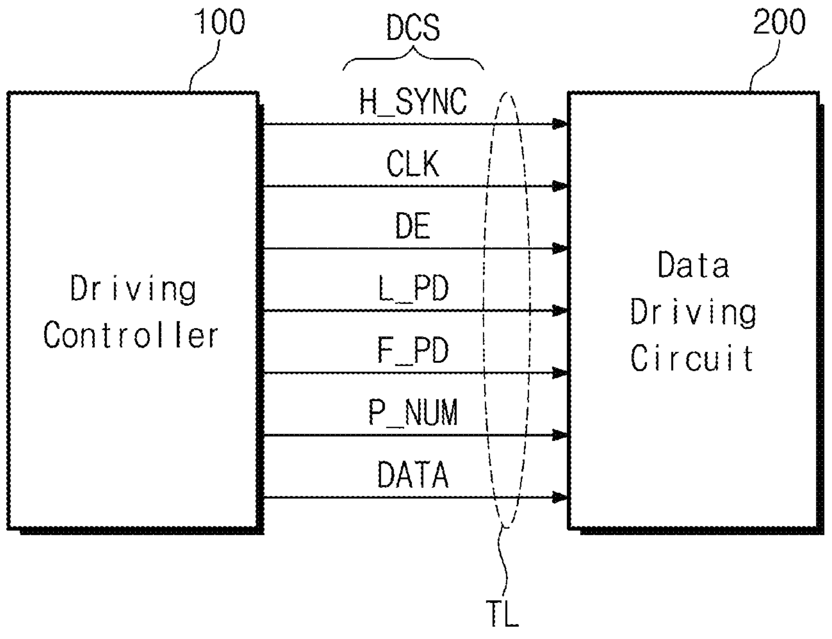
FIG. 3 is a block diagram of a driving controller and a data driving circuit, according to an embodiment of the present disclosure.

FIG. 3 is a block diagram of the driving controller 100 and the data driving circuit 200, according to an embodiment of the present disclosure.

Referring to FIG. 3, the driving controller 100 provides a data control signal DCS to the data driving circuit 200 through the transmission line TL. In an embodiment, the data control signal DCS includes a synchronization signal H_SYNC, a clock signal CLK, a data enable signal DE, a line protocol data L_PD, frame protocol data F_PD, a protocol data number signal P_NUM, and display data DATA.

The synchronization signal H_SYNC, the clock signal CLK, and the data enable signal DE may be signals for setting the operation timing of the data driving circuit 200. The line protocol data L_PD and the frame protocol data F_PD include configuration information for setting an operation of the data driving circuit 200. For example, the line protocol data L_PD may include information based on which the data driving circuit 200 may drive one line. The frame protocol data F_PD may include information such as, for example, voltage levels of reference voltages that serve as a reference for converting the display data DATA into a data signal. The display data DATA may include image signals corresponding to each of the pixels PX. In some aspects, the data driving circuit 200 may restore the display data DATA as the data signal, which may include converting the display data DATA into the data signal.

In an embodiment, the protocol data number signal P_NUM may include information (or the length of the frame protocol data F_PD) about the number of the frame protocol data F_PD.

In an embodiment, the driving controller 100 may transmit the data control signal DCS to the data driving circuit 200 according to universal panel interface (UPI) or universal panel interface for mobile (UPI-m).

FIG. 3 illustrates that the driving controller 100 provides the data control signal DCS to the data driving circuit 200 through the transmission line TL, but embodiments of the present disclosure are not limited thereto. In an embodiment, the data driving circuit 200 may transmit a signal to the driving controller 100 through the transmission line TL.

Figure 4:
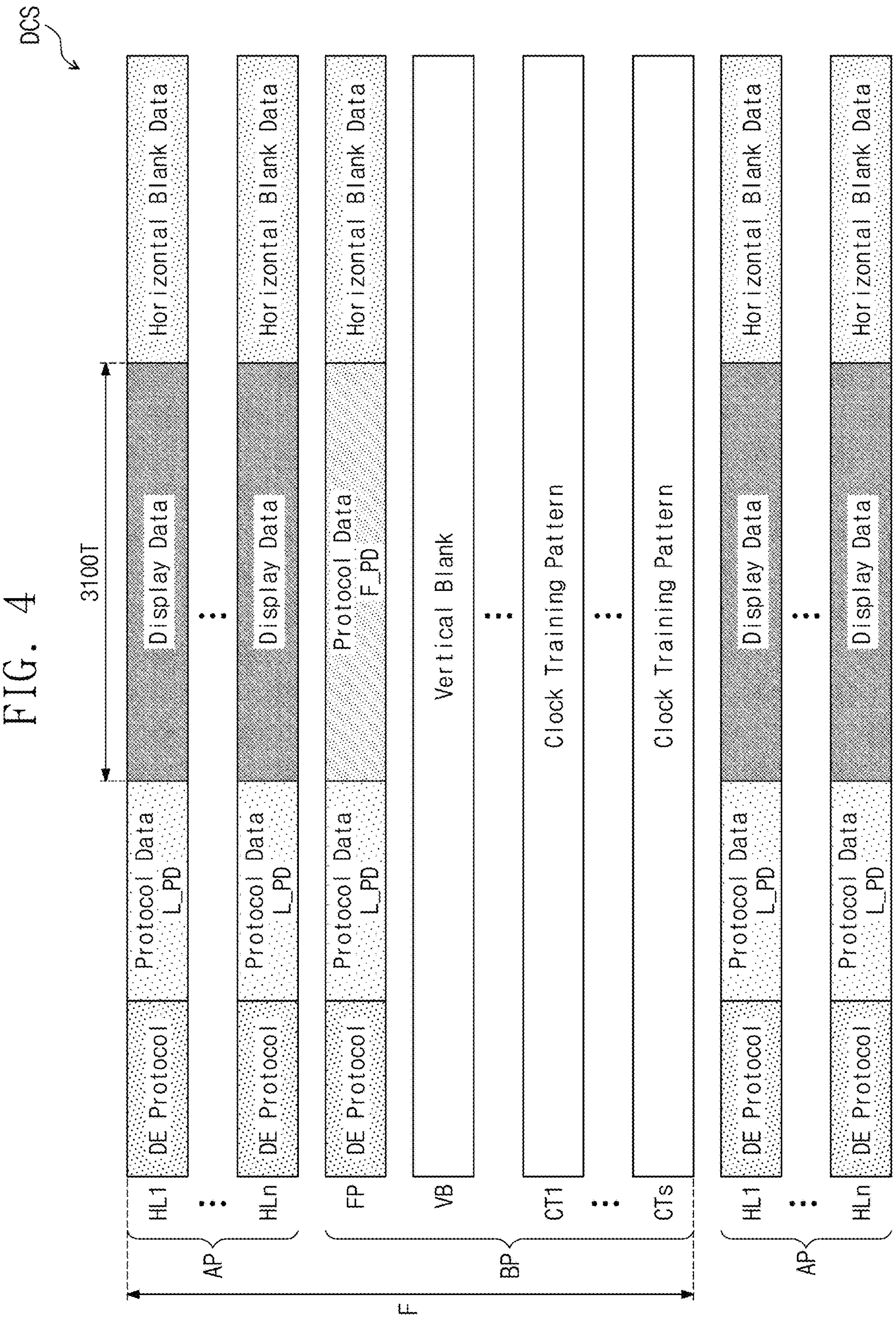
FIG. 4 is a diagram illustrating a data control signal provided from a driving controller to a data driving circuit according to an embodiment of the present disclosure.

FIG. 4 is a diagram illustrating the data control signal DCS provided from the driving controller 100 to the data driving circuit 200.

Referring to FIGS. 3 and 4, one frame F of the data control signal DCS includes an active period AP and a blank period BP. The active period AP may include horizontal line periods HL1 to HLn during which the display data DATA is transmitted. The horizontal line periods HL1 to HLn may correspond to 'n' rows of the display panel illustrated in FIG. 2, respectively.

Each of the horizontal line periods HL1 to HLn of the data control signal DCS may include a data enable protocol ('DE Protocol'), line protocol data corresponding to one line ('line protocol data L_PD'), the display data DATA, and horizontal blank data. In an embodiment, the data enable protocol may include the data enable signal DE, and the line protocol data corresponding to one line may include the line protocol data L_PD. In an embodiment, the horizontal blank data may be dummy data.

The blank period BP may include a frame protocol period FP, a vertical blank period VB, and the clock training periods CT1 to CTs. In an embodiment, the frame protocol period FP may include the data enable protocol, the line protocol data L_PD, the frame protocol data F_PD, and the horizontal blank data. The data enable protocol may include the data enable signal DE. In an embodiment, the line protocol data L_PD and the frame protocol data F_PD may be referred to as "protocol data".

Each of the clock training periods CT1 to CTs may include a clock training pattern for restoring the clock signal CLK.

Figure 5:
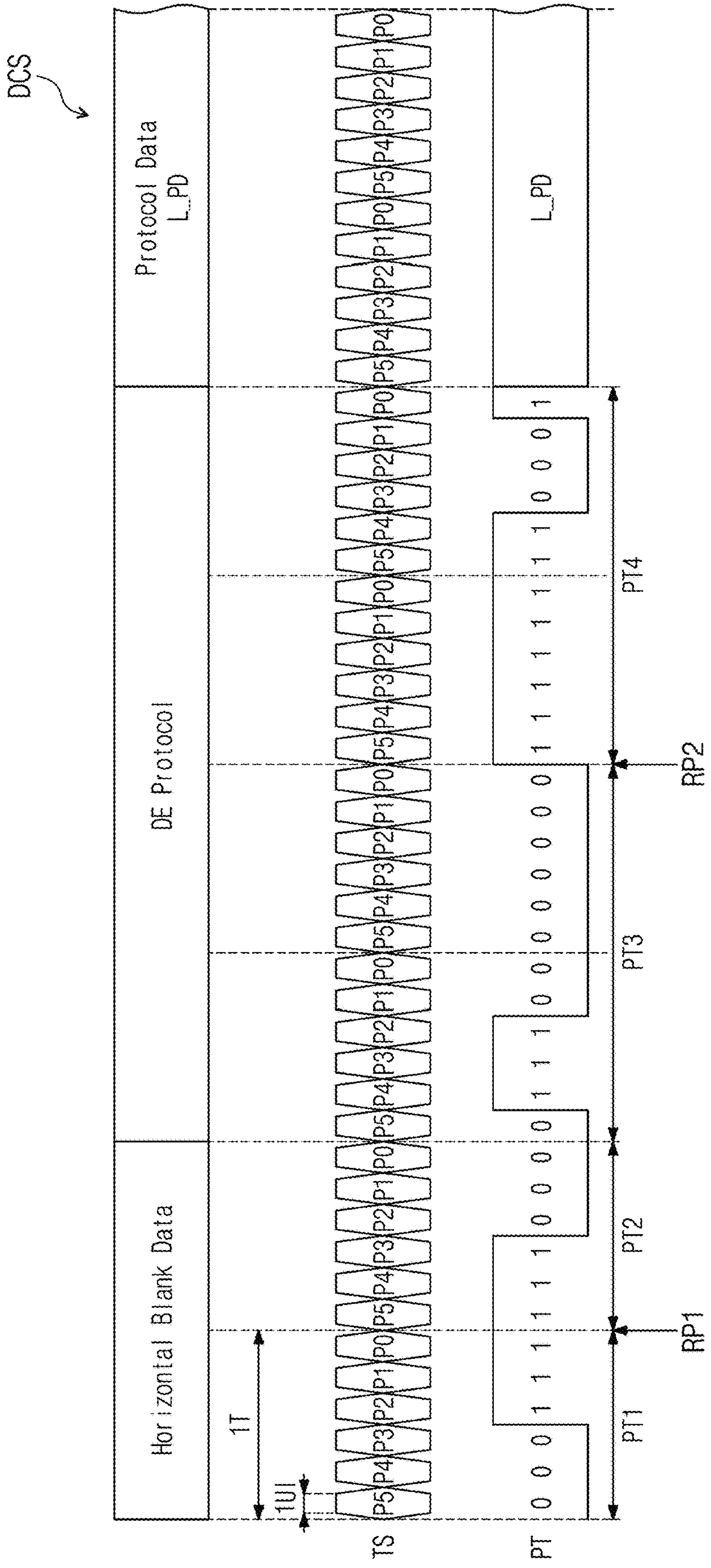
FIG. 5 is a diagram illustrating a portion of a data control signal according to an embodiment of the present disclosure.

FIG. 5 is a diagram illustrating a portion of the data control signal DCS.

FIG. 5 illustrates that "TS" indicates the data control signal DCS in transmission units, and "PT" represents a pattern PT of the data control signal DCS.

Referring to FIGS. 3 and 5, 1 unit 1T may include 6 UIs P0 to P5. Horizontal blank data may include a first pattern PT1 and a second pattern PT2. The first pattern PT1 and the second pattern PT2 may be symmetrical with respect to a reference point RP1.

The data enable protocol may include a third pattern PT3 and a fourth pattern PT4. The third pattern PT3 and the fourth pattern PT4 may be symmetrical with respect to a reference point RP2.

Horizontal blank data and data enable protocol transmitted by the driving controller 100 may be scrambled data signals. In other words, the horizontal blank data and the data enable protocol may be signals encoded according to predetermined rules.

In an embodiment, the line protocol data L_PD and the frame protocol data F_PD are unscrambled signals. In some aspects, the line protocol data L_PD and the frame protocol data F_PD are not scrambled because they include pieces of important information necessary for the operation of the data driving circuit 200.

The line protocol data L_PD has a short length (e.g. 16 T to 24 T), and bits are allocated in units of 1 UI. Accordingly, the asymmetry of the line protocol data L_PD is not significantly affected.

The length of the frame protocol data F_PD may be greater than length of the line protocol data L_PD (e.g., the length of the frame protocol data F_PD may be 1000 T or higher), and bits are allocated in units of 1 unit (1 T). Accordingly, the asymmetry of the frame protocol data F_PD may be significantly affected.

Figure 6:
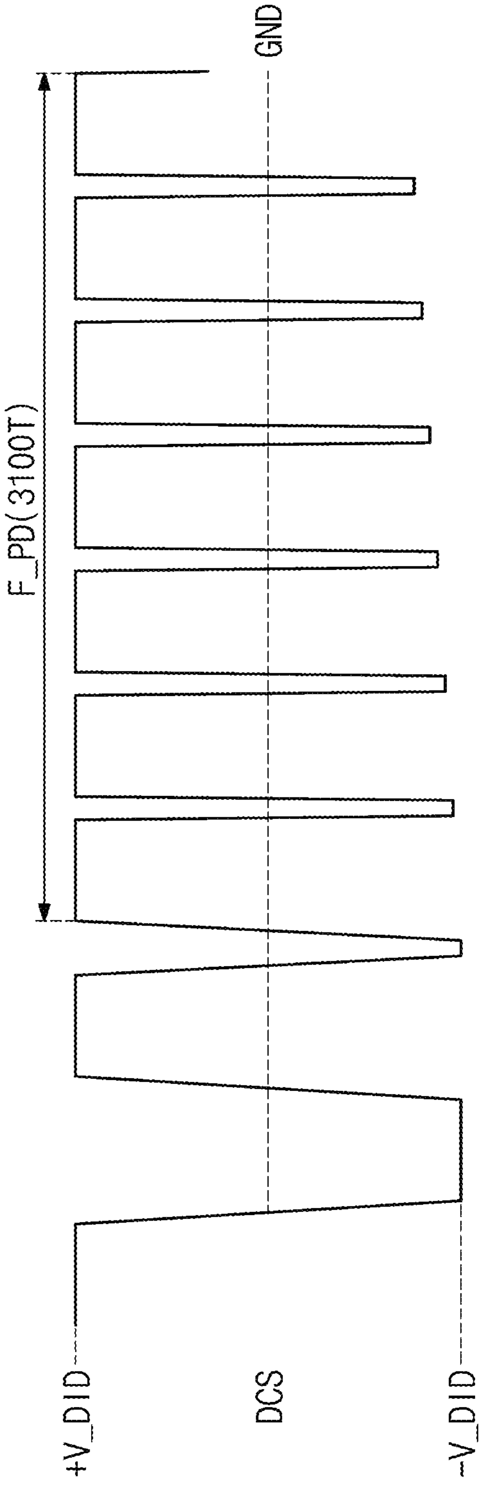
FIG. 6 is a diagram illustrating a portion of data control signal according to an embodiment of the present disclosure.

FIG. 6 is a diagram illustrating a portion of the data control signal DCS.

Referring to FIG. 6, the length of the frame protocol data F_PD among the data control signal DCS may be 3100 T, and the length of the display data DATA may be 3100 T. That is, for example, the length of the frame protocol data F_PD may be equal to the length of the display data DATA. In an embodiment, the frame protocol data F_PD may include frame configuration data, reserved data, and dummy data. The frame configuration data, the reserved data, and the dummy data may be 71 units (i.e., 71 T), 84 units (i.e., 84 T), and 2945 units (i.e., 2945 T), respectively.

The data control signal DCS may be a signal that swings between a first driving voltage +V_DID and a second driving voltage −V_DID. In an embodiment, the first driving voltage +V_DID and the second driving voltage −V_DID may be symmetrical, with the reference voltage GND between the first driving voltage +V_DID and the second driving voltage −V_DID. That is, a voltage difference between the first driving voltage +V_DID and the reference voltage GND is the same as a voltage difference between the reference voltage GND and the second driving voltage −V_DID.

The unscrambled frame protocol data F_PD may have asymmetry biased towards one of the first driving voltage +V_DID and the second driving voltage −V_DID. In particular, when both the reserved data and the dummy data are at high levels (i.e. logic '1'), the frame protocol data F_PD may be biased toward the first driving voltage +V_DID.

FIGS. 7 and 8 show the frame protocol data F_PD.

Referring to FIG. 7, 1 unit 1 T (e.g., any of units T1 through T100) may include 6 UIs P0 to P5. Each of units T2 to T93 may include frame configuration data (e.g., OCHOP [1:0], GCHOP[1:0], PTT, and SB_F[2:1]). Each of units T95 to T100 may include reserved data.

When both the frame configuration data and the reserved data are at a high level (i.e. logic '1'), the frame protocol data F_PD may be biased toward the first driving voltage +V_DID.

In an embodiment, the frame configuration data and the reserved data of the frame protocol data F_PD may be unscrambled signals.

Referring to FIGS. 3 and 8, each of units T2 to T4 may include the protocol data number signal P_NUM. The protocol data number signal P_NUM may include information (or the length of the frame protocol data F_PD) about the number of the frame protocol data F_PD. In an embodiment, the protocol data number signal P_NUM is a 3-bit signal. For example, the unit T2 includes the protocol data number signal P_NUM[2]. For example, the unit T3 includes the protocol data number signal P_NUM[1]. For example, the unit T4 includes the protocol data number signal P_NUM [0]. In an embodiment, the protocol data number signal P_NUM may be the number of frame configuration data. Each of the units T2 to T93 may include frame configuration data. In an embodiment, in the example illustrated in FIG. 8, the protocol data number signal P_NUM may be 91 T. Each of units T95 to T100 may include reserved data.

In an example in which the protocol data number signal P_NUM[2:0] is '000', the length of frame configuration data may be 30 T. In an example in which the protocol data number signal P_NUM[2:0] is '001', the length of frame configuration data may be 60 T. In an example in which the protocol data number signal P_NUM[2:0] is '111', the length of frame configuration data may be 240 T.

As such, the protocol data number signal P_NUM[2:0] may be determined based on the length of the frame configuration data in the frame protocol data F_PD.

In an embodiment, the frame configuration data of the frame protocol data F_PD may be an unscrambled signal, and the reserved data of the frame protocol data F_PD may be a scrambled signal. Although not illustrated in FIG. 8, the dummy data of the frame protocol data F_PD is a scrambled signal.

The driving controller 100 may transmit the protocol data number signal P_NUM and frame configuration data (e.g., OCHOP[1:0] and GCHOP[1:0]) in the frame protocol data F_PD to the data driving circuit 200 without scrambling. The driving controller 100 may scramble reserved data and dummy data in the frame protocol data F_PD and may transmit the scrambled data to the data driving circuit 200.

In an embodiment, the driving controller 100 may transmit data (XP_NUM[2:0]) from scrambling the protocol data number signal P_NUM in the frame protocol data F_PD to the driving circuit 200 as reserved data, and the driving controller 100 may transmit data (e.g., XOCHOP[1:0] and XGCHOP[1:0]) from scrambling frame configuration data (e.g., OCHOP[1:0] and GCHOP[1:0]) in the frame protocol data F_PD to the data driving circuit 200 as dummy data. In an embodiment, the driving controller 100 may generate or output dummy data by scrambling both the protocol data number signal P_NUM and the frame configuration data in units of 1 unit (1 T).

The data driving circuit 200 receives frame configuration data in the frame protocol data F_PD based on the protocol data number signal P_NUM in the frame protocol data F_PD. Moreover, the data driving circuit 200 may consider data after frame configuration data as dummy data based on the protocol data number signal P_NUM in the frame protocol data F_PD, and thus may ignore the data after frame configuration data.

Figure 9:
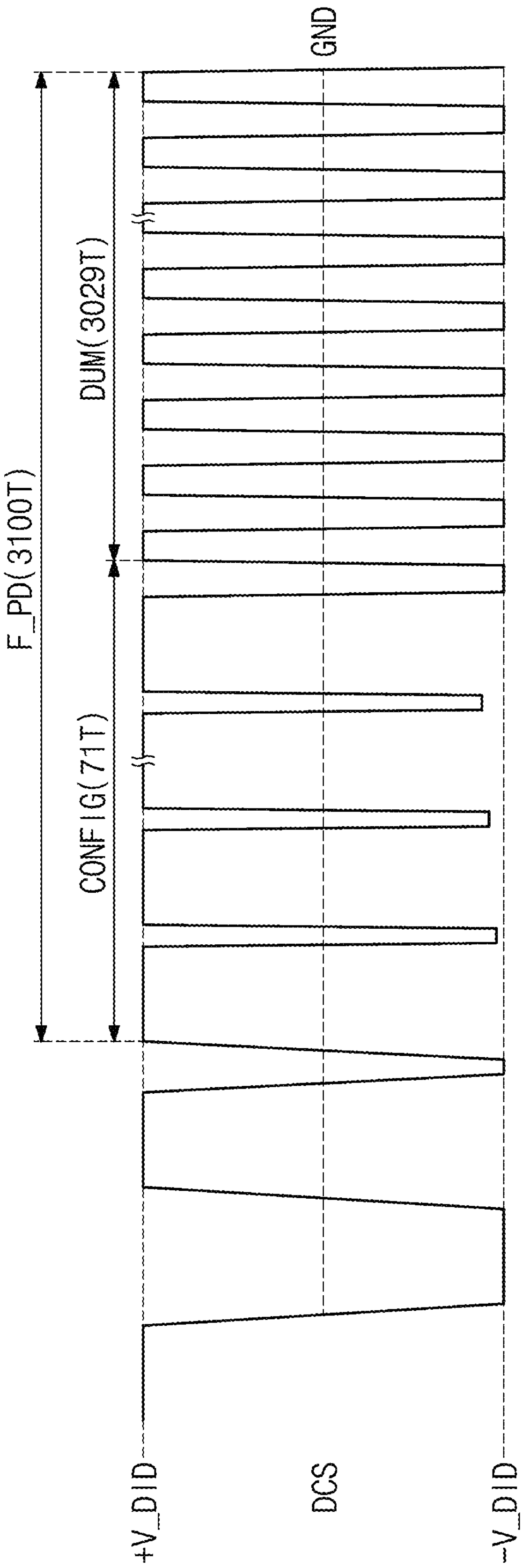
FIG. 9 is a diagram illustrating a portion of data control signal according to an embodiment of the present disclosure.

FIG. 9 is a diagram illustrating a portion of the data control signal DCS.

Referring to FIG. 9, a length of the frame protocol data F_PD in the data control signal DCS may be 3100 T. In an embodiment, the frame protocol data F_PD may include frame configuration data CONFIG and dummy data DUM. The frame configuration data CONFIG and the dummy data DUM may be 71 units (71 T) and 3029 units (3029 T), respectively.

The data control signal DCS may be a signal that swings between a first driving voltage +V_DID and a second driving voltage −V_DID. In an embodiment, the first driving voltage +V_DID and the second driving voltage −V_DID may be symmetrical, with the reference voltage GND between the first driving voltage +V_DID and the second driving voltage −V_DID.

The unscrambled frame configuration data CONFIG in the frame protocol data F_PD may have an asymmetry biased towards either the first driving voltage +V_DID or the second driving voltage −V_DID. As explained in FIG. 8, because the dummy data DUM is scrambled, the dummy data DUM may be a signal swinging between the first driving voltage +V_DID and the second driving voltage −V_DID.

In the example illustrated in FIG. 9, the dummy data DUM is longer than the frame configuration data CONFIG. Accordingly, when the dummy data DUM is scrambled, the signal asymmetry of the entire frame protocol data F_PD may be improved.

Figure 10:
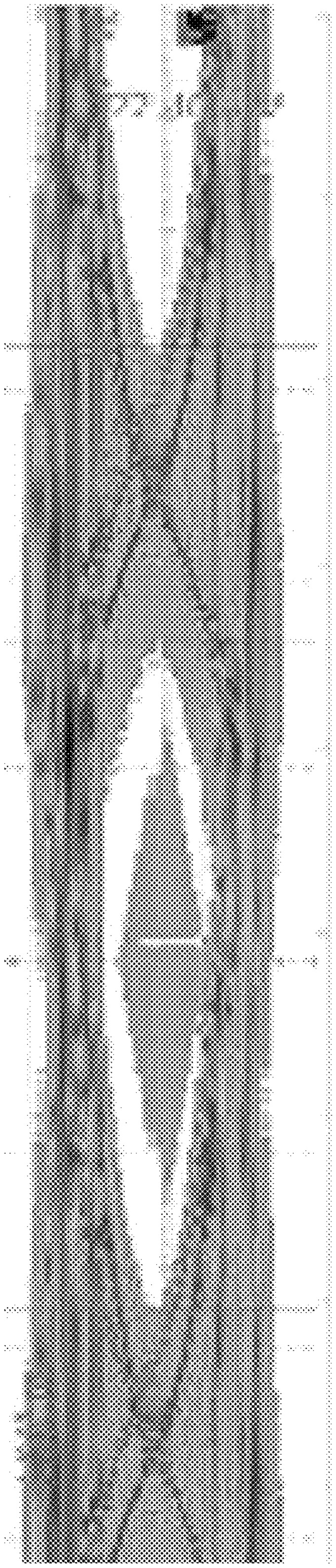
FIGS. 10 and 11 are diagrams illustrating test results for signal integrity of frame protocol data.
Figure 11:
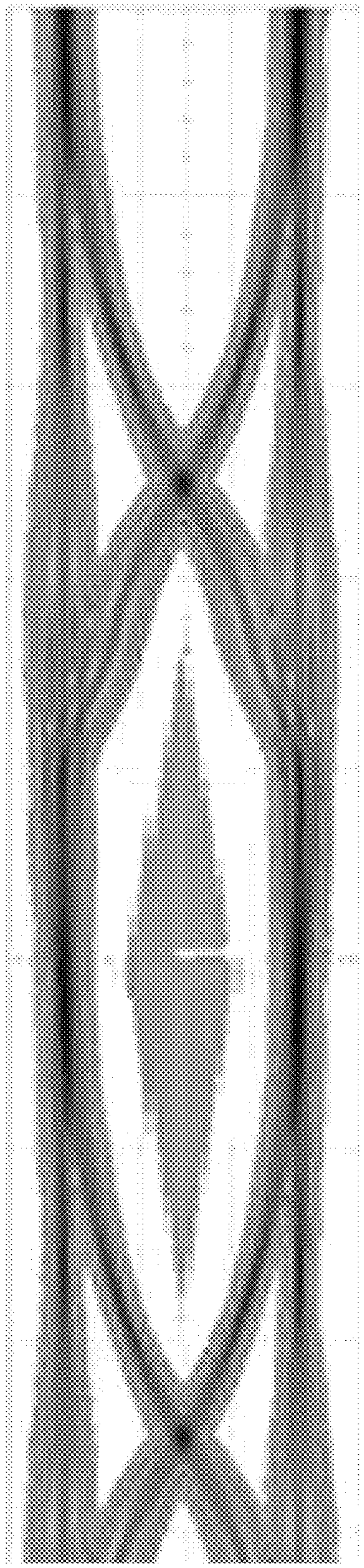

FIGS. 10 and 11 are diagrams illustrating test results for signal integrity of the frame protocol data F_PD.

FIG. 10 is an eye diagram illustrating a signal integrity test result of the frame protocol data F_PD when dummy data is not scrambled.

FIG. 11 is an eye diagram illustrating a signal integrity test result of the frame protocol data F_PD when dummy data is scrambled.

In FIGS. 10 and 11, a horizontal direction indicates time and a vertical direction indicates a voltage.

Referring to FIGS. 10 and 11, it may be seen that signal integrity characteristics of the frame protocol data F_PD may be improved when the dummy data DUM included in the frame protocol data F_PD is scrambled.

Figure 12:
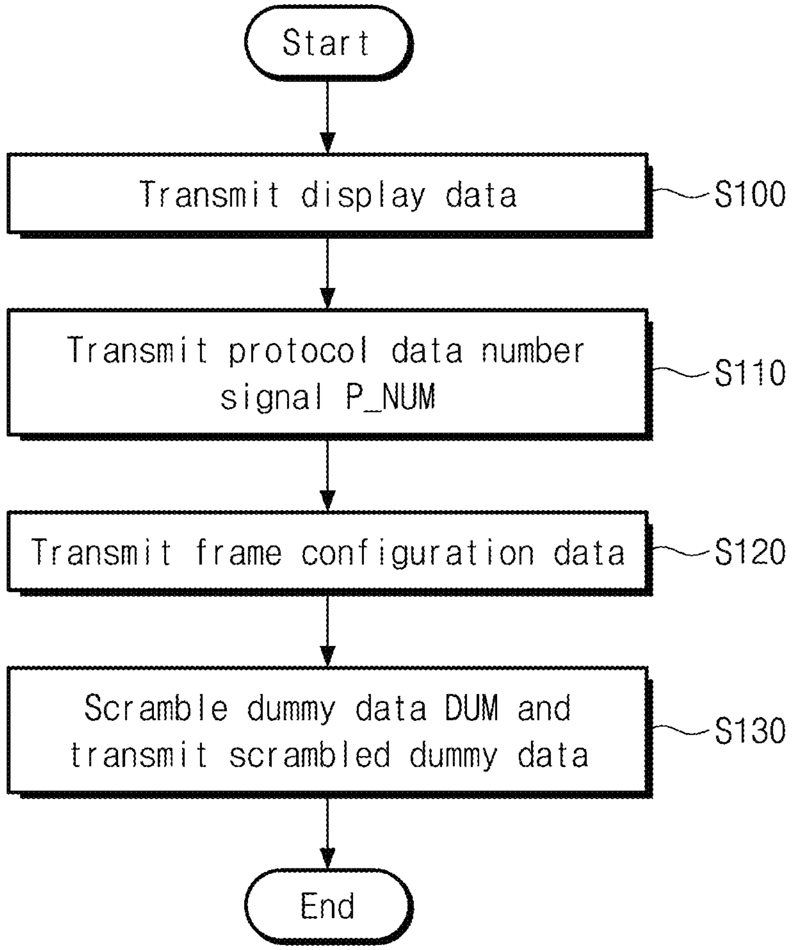
FIG. 12 is a flowchart illustrating an operation of a driving controller, according to an embodiment of the present disclosure.

FIG. 12 is a flowchart illustrating an operation of the driving controller 100, according to an embodiment of the present disclosure.

Referring to FIGS. 3, 4, and 12, the driving controller 100 transmits the display data DATA to the data driving circuit 200 during the active period AP (operation S100).

The driving controller 100 transmits the protocol data number signal P_NUM in the frame protocol data F_PD to the data driving circuit 200 during the blank period BP (operation S110). In an embodiment, the protocol data number signal P_NUM may be included at the start location of the frame protocol data F_PD.

The driving controller 100 transmits the frame configuration data CONFIG (see FIG. 9) in the frame protocol data F_PD to the data driving circuit 200 such that the frame configuration data CONFIG follows (e.g., is transmitted after) the protocol data number signal P_NUM (operation S120).

The driving controller 100 transmits the dummy data DUM (see FIG. 9) in the frame protocol data F_PD to the data driving circuit 200 (operation S130). The driving controller 100 scrambles the dummy data DUM and transmits the scrambled dummy data to the data driving circuit 200. In an embodiment, as explained in FIG. 8, the dummy data DUM may include data (XP_NUM[2:0]) from scrambling the protocol data number signal P_NUM, and data (e.g., XOCHOP[1:0] and XGCHOP[1:0]) from scrambling frame configuration data (e.g., OCHOP[1:0] and GCHOP[1:0]) in the frame protocol data F_PD.

Figure 13:
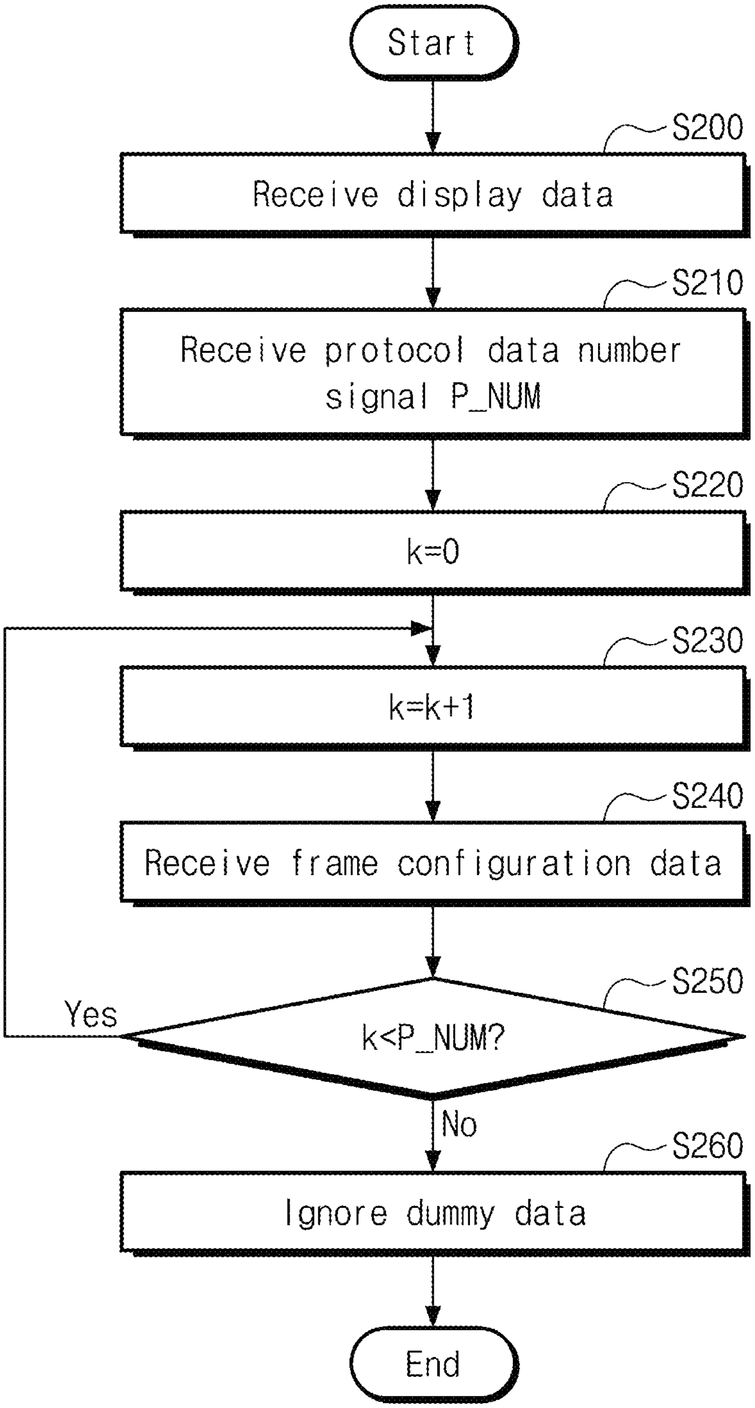
FIG. 13 is a flowchart illustrating an operation of a data driving circuit, according to an embodiment of the present disclosure.

FIG. 13 is a flowchart illustrating an operation of the data driving circuit 200, according to an embodiment of the present disclosure.

Referring to FIGS. 3, 4, and 13, the data driving circuit 200 receives the display data DATA (operation S200).

The data driving circuit 200 receives the protocol data number signal P_NUM among the frame protocol data F_PD (operation S210).

The data driving circuit 200 initializes a count value 'k' to 0 (operation S220).

The data driving circuit 200 increases the count value 'k' by 1 (operation S230).

The data driving circuit 200 receives the frame configuration data CONFIG (see FIG. 9) in the frame protocol data F_PD (operation S240). The frame configuration data CONFIG may be received in units of 1 unit (i.e., 1 T).

Whenever the frame configuration data CONFIG is received in units of 1 unit (i.e., 1 T), the data driving circuit 200 compares the count value 'k' with the protocol data number signal P_NUM (operation S250).

When the count value 'k' is smaller than the protocol data number signal P_NUM, the control returns to operation S230. For example, when the data driving circuit 200 determines the count value 'k' is smaller than the protocol data number signal P_NUM, the data driving circuit 200 may return to operation S230. The data driving circuit 200 may repeatedly receive the frame configuration data CONFIG (see FIG. 9) in the frame protocol data F_PD. For example, the data driving circuit 200 may receive the frame configuration data CONFIG when the count value 'k' is smaller than the protocol data number signal P_NUM.

When the count value 'k' is greater than or equal to the protocol data number signal P_NUM, the data driving circuit 200 regards that reception of the frame configuration data CONFIG in the frame protocol data F_PD has ended. For example, the data driving circuit 200 may determine that reception of the frame configuration data CONFIG in the frame protocol data F_PD has ended, based on determining the count value 'k' is greater than or equal to the protocol data number signal P_NUM. The data driving circuit 200 may regard a signal, which is received after the frame configuration data CONFIG in the frame protocol data F_PD, as the dummy data DUM (see FIG. 9) and may ignore the signal (operation S260).

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to an embodiment of the present disclosure, the integrity of a signal provided from a driving controller to a data driving circuit may be improved. Accordingly, the reliability of the display device may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
- a display panel;
- a driving controller configured to transmit a data control signal; and
- a data driving circuit configured to:
  - receive the data control signal;
  - provide a data signal to the display panel based on the data control signal;
  - determine a length of frame configuration data based on a protocol data number signal comprised in frame protocol data; and
  - ignore scrambled dummy data received after the frame configuration data,
- wherein the data control signal comprises the frame protocol data for setting an operation of the data driving circuit, and
- wherein the frame protocol data comprises the protocol data number signal, the frame configuration data, and the scrambled dummy data.

2. The display device of claim 1, wherein the protocol data number signal and the frame configuration data are not scrambled.

3. The display device of claim 1, wherein the protocol data number signal is comprised at a start location of the frame protocol data.

4. The display device of claim 1, wherein the driving controller is configured to generate the scrambled dummy data by scrambling the protocol data number signal and the frame configuration data.

5. The display device of claim 1, wherein the data control signal comprises display data during an active period and the frame protocol data during a blank period.

6. The display device of claim 5, wherein a length of the display data is equal to a length of the frame protocol data.

7. The display device of claim 5, wherein the data driving circuit is configured to restore the display data as the data signal.

8. The display device of claim 1, wherein the data driving circuit is configured to:
- increase a count value associated with the frame configuration data when the frame configuration data is received; and
- ignore the scrambled dummy data received after the frame configuration data when the count value is greater than or equal to the protocol data number signal.

9. The display device of claim 1, wherein the data control signal is a signal which swings between a first driving voltage and a second driving voltage.

10. An operating method of a display device, the operating method comprising:
- transmitting display data to a data driving circuit;
- transmitting a protocol data number signal to the data driving circuit;
- transmitting frame configuration data to the data driving circuit;
- transmitting scrambled dummy data to the data driving circuit;
- determining, by the data driving circuit, a length of the frame configuration data based on the protocol data number signal; and
- ignoring, by the data driving circuit, the scrambled dummy data.

11. The operating method of claim 10, wherein the protocol data number signal and the frame configuration data are not scrambled.

12. The operating method of claim 10, wherein the transmitting of the scrambled dummy data to the data driving circuit comprises:
- generating the scrambled dummy data by scrambling the protocol data number signal and the frame configuration data.

13. The operating method of claim 10, wherein the protocol data number signal, the frame configuration data, and the scrambled dummy data are comprised in frame protocol data.

14. The operating method of claim 13, wherein a length of the display data is equal to a length of the frame protocol data.

15. The operating method of claim 14, further comprising:
- restoring, by the data driving circuit, the display data as a data signal; and
- providing, by the data driving circuit, the data signal to a display panel.

16. The operating method of claim 10, further comprising:
- increasing, by the data driving circuit, a count value associated with the frame configuration data when the frame configuration data is received.

17. The operating method of claim 16, further comprising:
- ignoring, by the data driving circuit, the scrambled dummy data received after the frame configuration data when the count value is greater than or equal to the protocol data number signal.

18. The operating method of claim 16, further comprising:
- receiving the frame configuration data at the data driving circuit when the count value is smaller than the protocol data number signal.

* * * * *